Jan. 10, 1956
W. W. SLOANE
2,730,343
MECHANICAL MINER WITH CUTTER HEAD PROVIDED
WITH A RECIPROCATING WEIGHT
Filed June 17, 1952
8 Sheets-Sheet 5
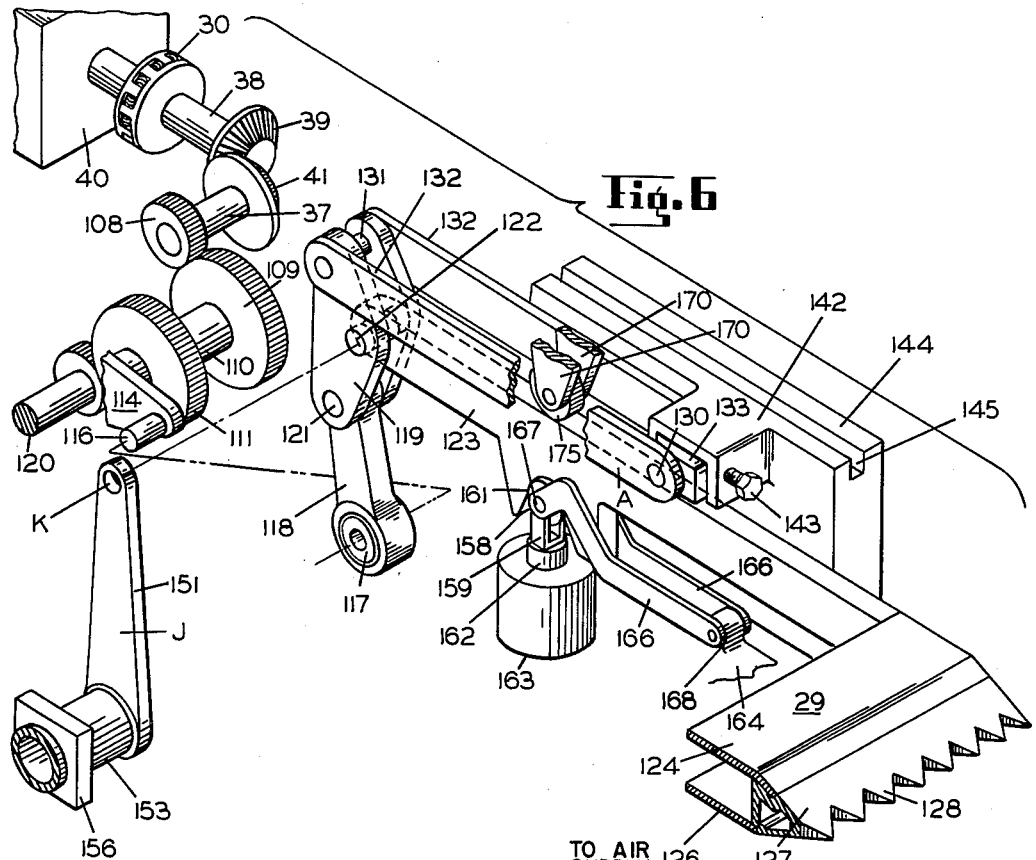
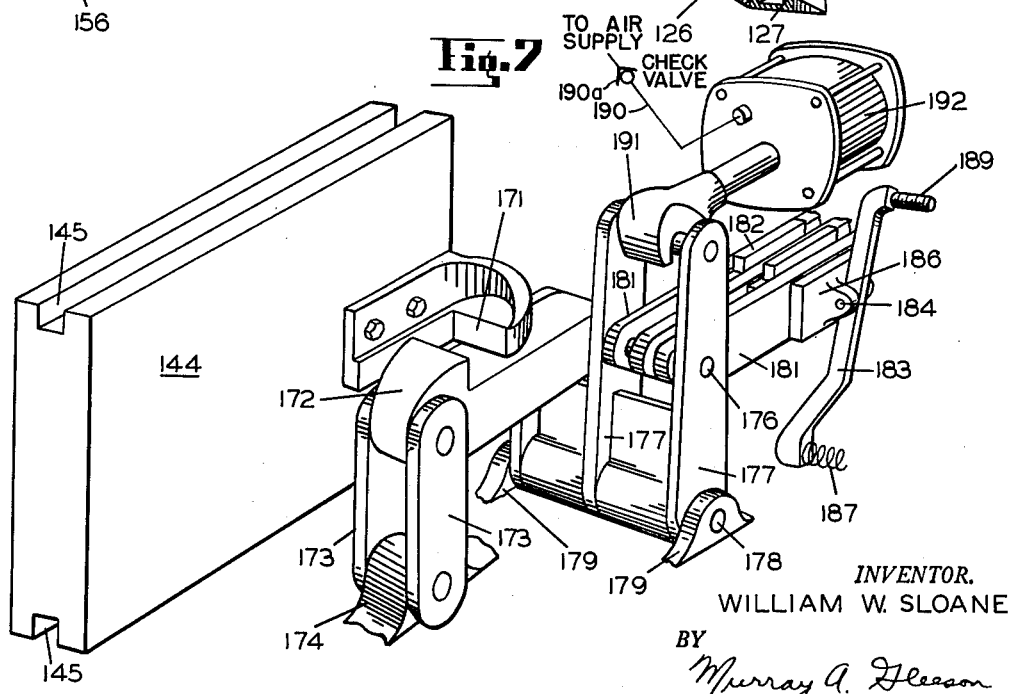
INVENTOR.
WILLIAM W. SLOANE
BY
Murray A. Gleeson
ATTORNEY Jan. 10, 1956 W. W. SLOANE 2,730,343
MECHANICAL MINER WITH CUTTER HEAD PROVIDED
WITH A RECIPROCATING WEIGHT
Filed June 17, 1952 8 Sheets-Sheet 6
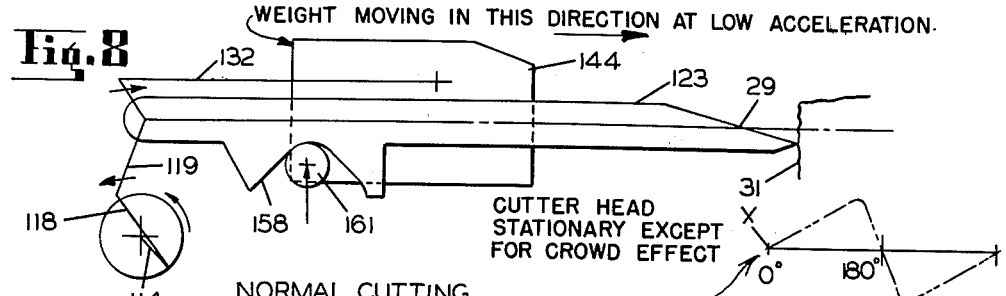
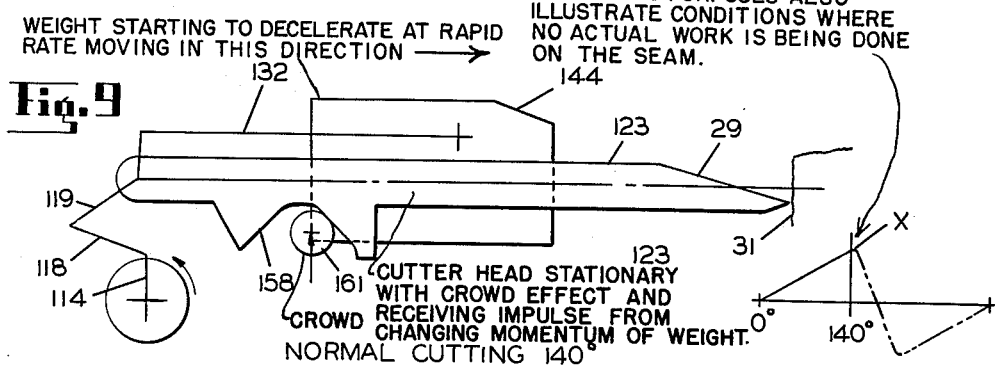
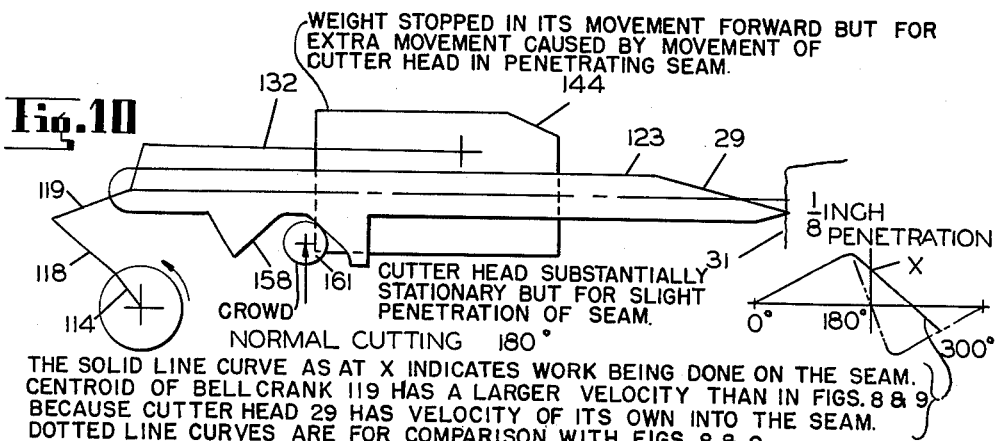
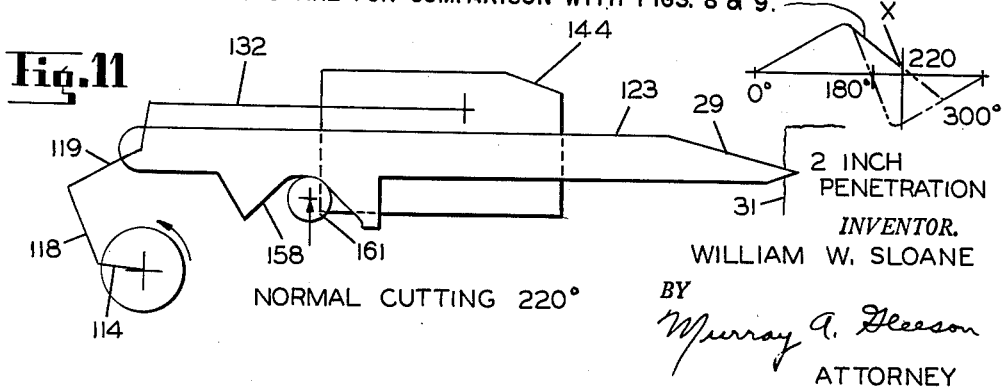
INVENTOR.
WILLIAM W. SLOANE
BY
Murray A. Gleeson
ATTORNEY

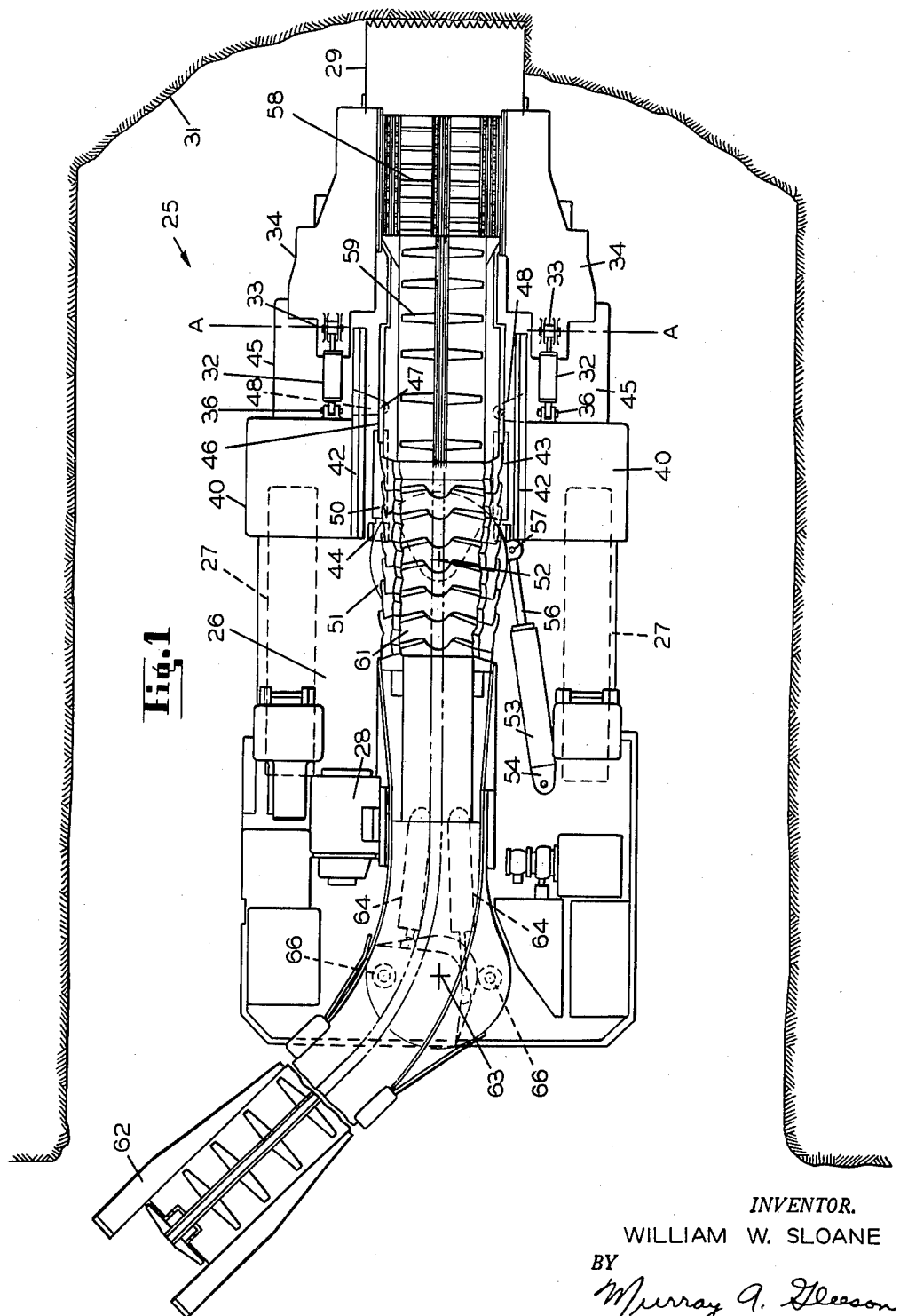

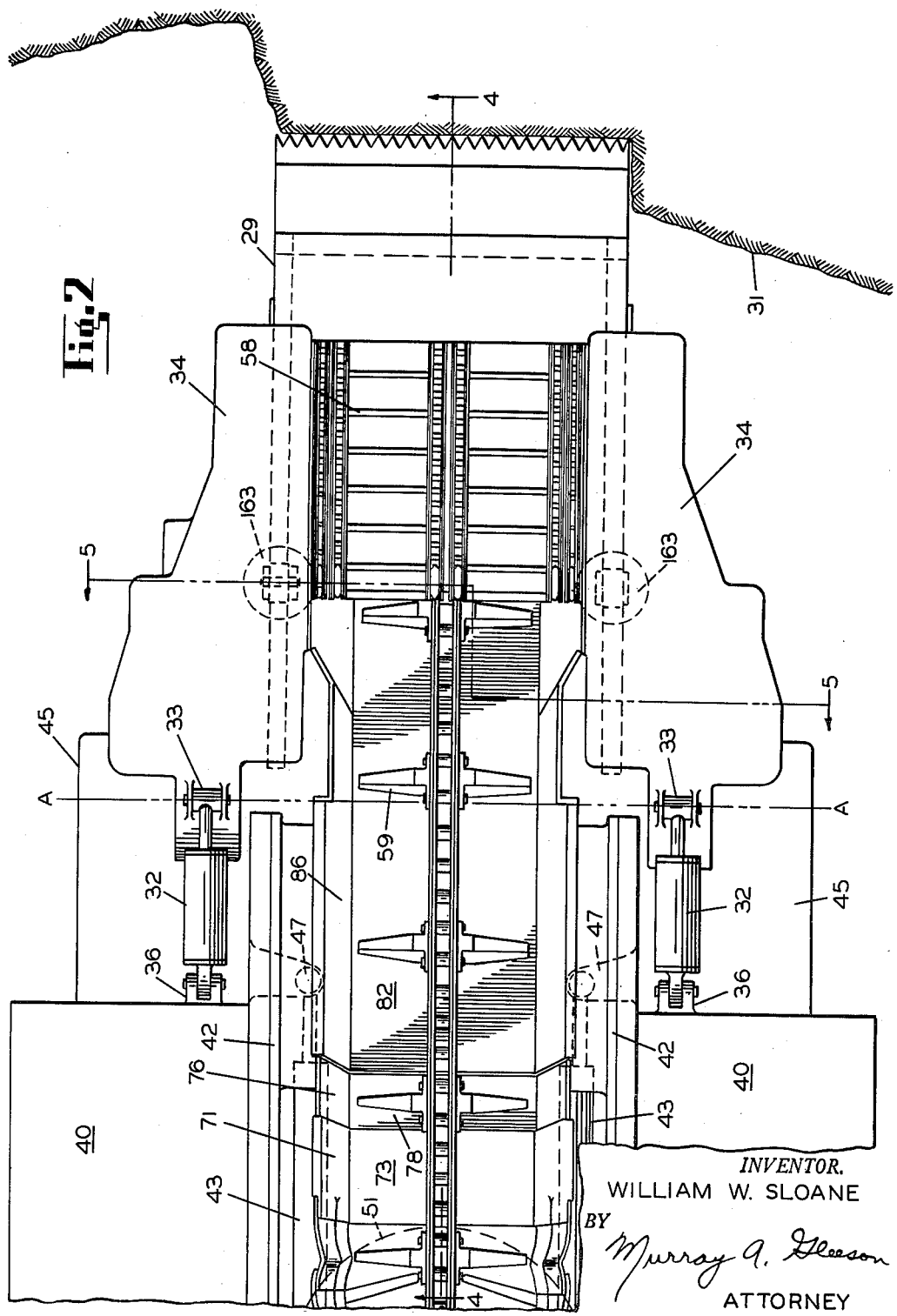

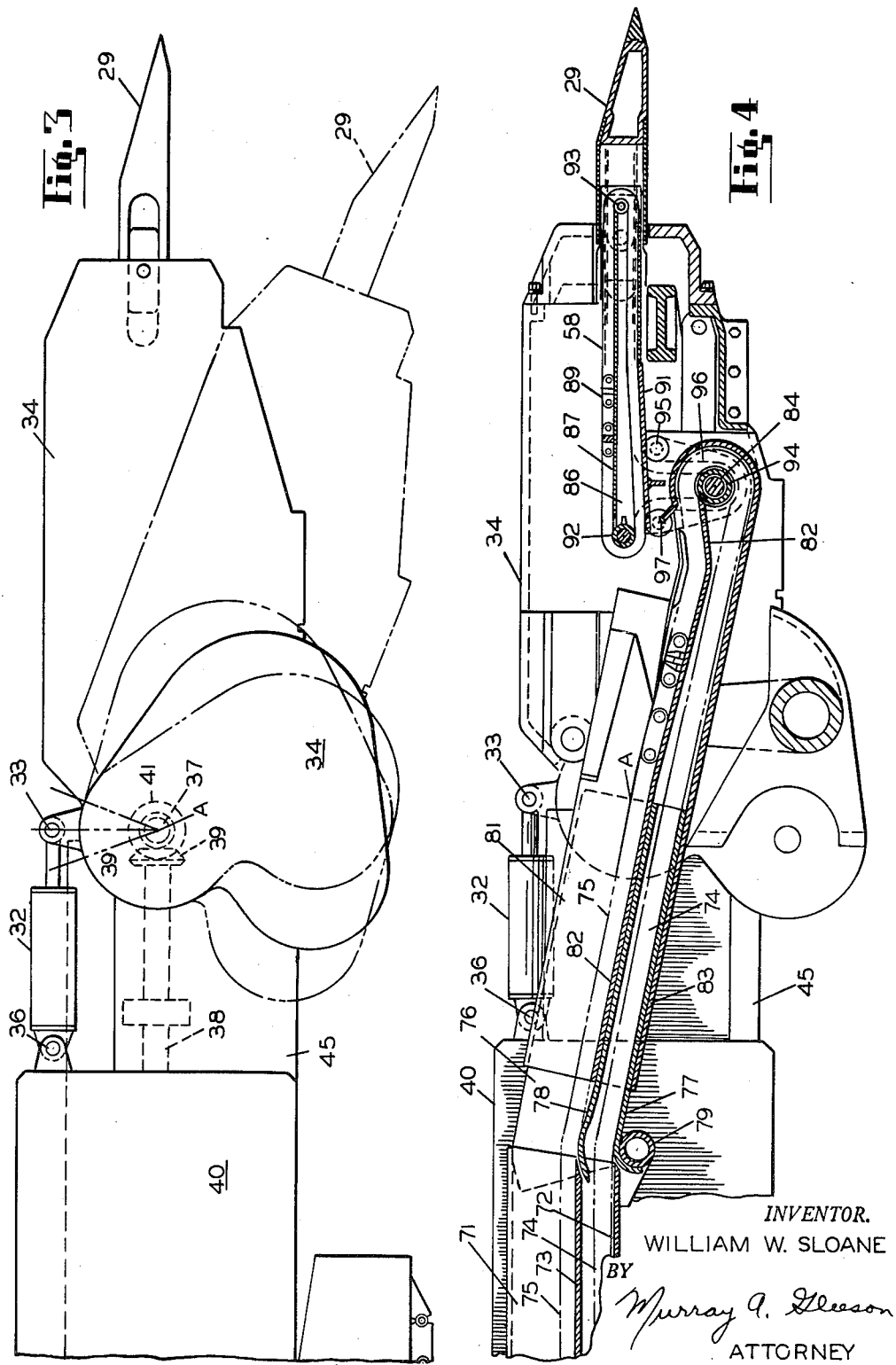

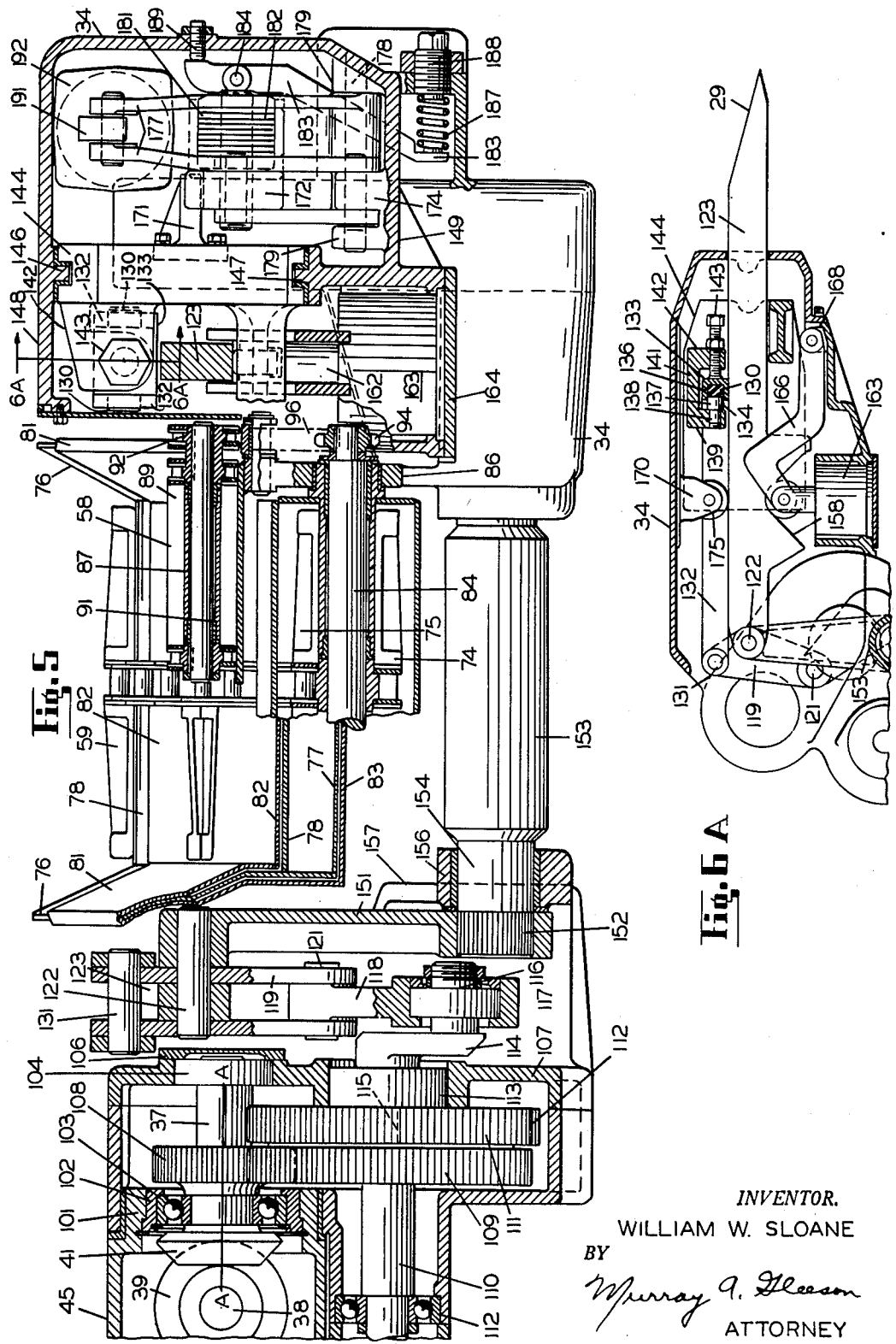

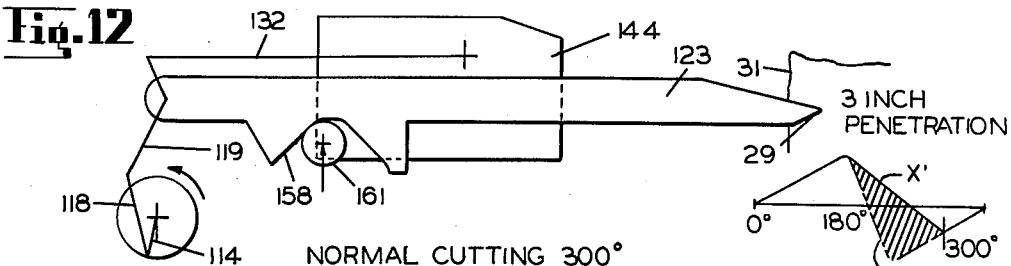
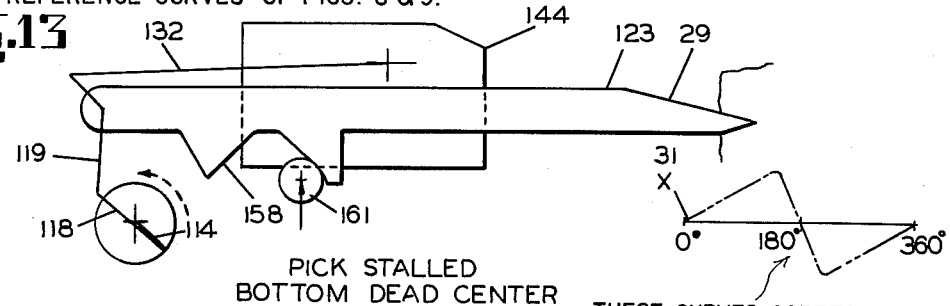
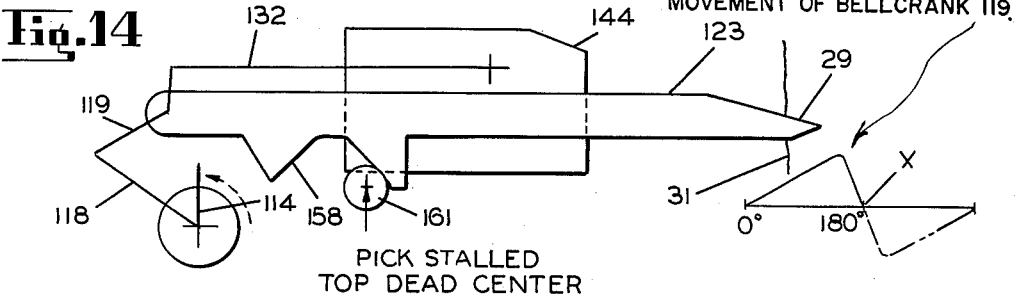
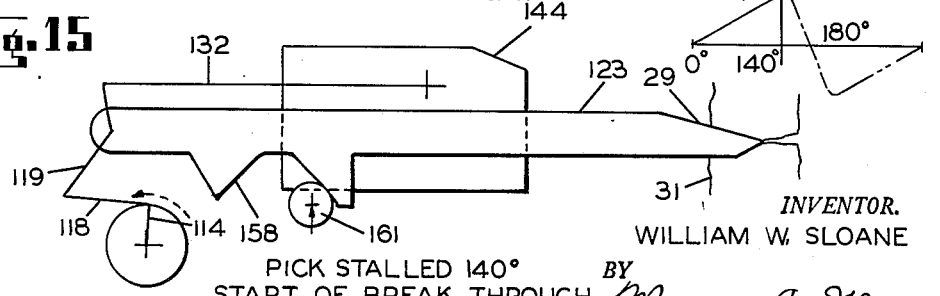

Jan. 10, 1956     W. W. SLOANE     2,730,343
MECHANICAL MINER WITH CUTTER HEAD PROVIDED
WITH A RECIPROCATING WEIGHT
Filed June 17, 1952                  8 Sheets-Sheet 8

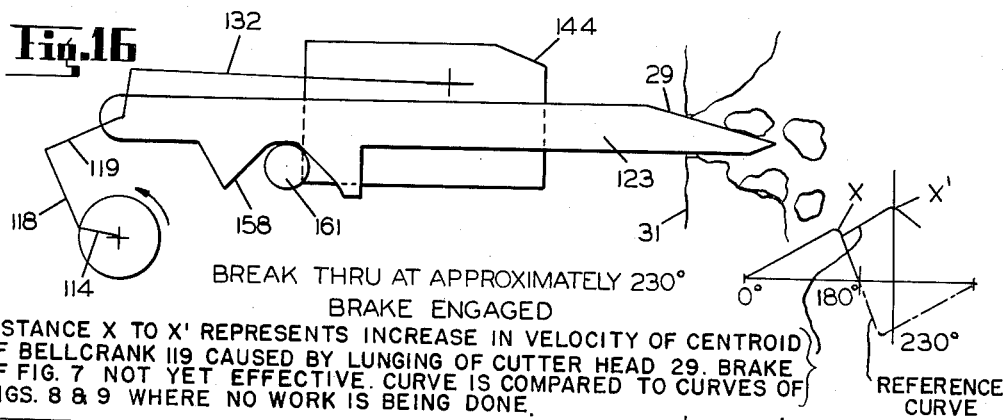

BREAK THRU AT APPROXIMATELY 230°
BRAKE ENGAGED
DISTANCE X TO X' REPRESENTS INCREASE IN VELOCITY OF CENTROID
OF BELLCRANK 119 CAUSED BY LUNGING OF CUTTER HEAD 29. BRAKE
OF FIG. 7 NOT YET EFFECTIVE. CURVE IS COMPARED TO CURVES OF
FIGS. 8 & 9 WHERE NO WORK IS BEING DONE.

REFERENCE CURVE

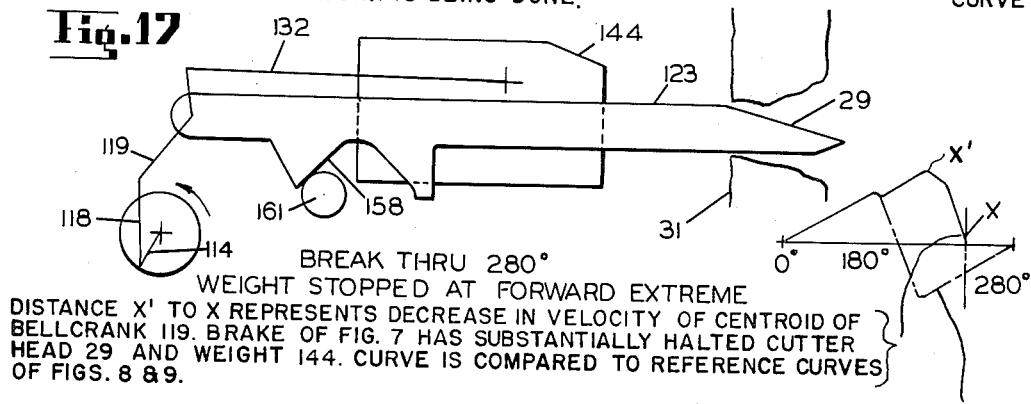

BREAK THRU 280°
WEIGHT STOPPED AT FORWARD EXTREME
DISTANCE X' TO X REPRESENTS DECREASE IN VELOCITY OF CENTROID OF
BELLCRANK 119. BRAKE OF FIG. 7 HAS SUBSTANTIALLY HALTED CUTTER
HEAD 29 AND WEIGHT 144. CURVE IS COMPARED TO REFERENCE CURVES
OF FIGS. 8 & 9.

REFERENCE CURVE; SEE FIGS. 8 & 9.

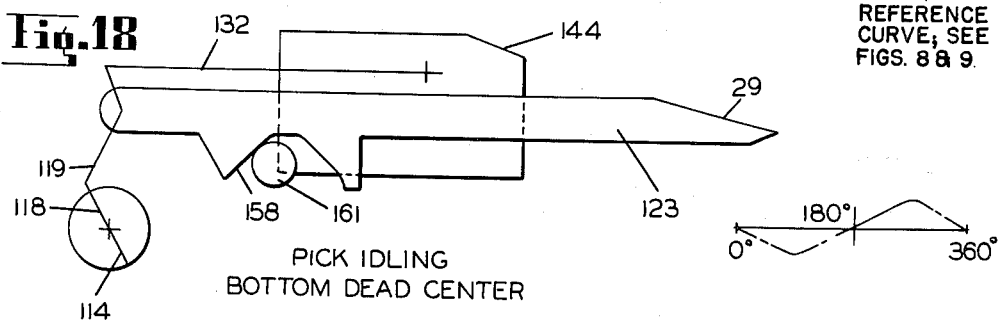

PICK IDLING
BOTTOM DEAD CENTER

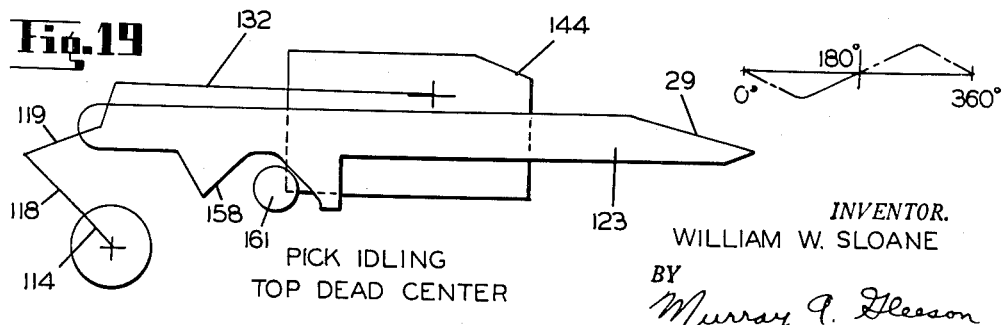

PICK IDLING
TOP DEAD CENTER

*INVENTOR.*
WILLIAM W. SLOANE
BY
*Murray G. Gleeson*
ATTORNEY

United States Patent Office 2,730,343
Patented Jan. 10, 1956

2,730,343

MECHANICAL MINER WITH CUTTER HEAD PROVIDED WITH A RECIPROCATING WEIGHT

William W. Sloane, Chicago, Ill., assignor to Goodman Manufacturing Company, Chicago, Ill., a corporation of Illinois Application June 17, 1952, Serial No. 293,958

8 Claims. (Cl. 262—8)

This invention relates generally to mining machines and more particularly to a machine for removing coal from a solid seam thereof without the need for blasting.

This invention is an improvement over the invention shown in Sloane Patent No. 2,565,528, issued August 28, 1951, for Improvements in Mechanical Miner.

In the aforesaid Sloane patent there is shown a mechanical miner wherein coal is fragmented from a seam thereof by a cutting head which is given an impulse by a weight arm moving cyclically with respect thereto and connected to the cutter head by a linkage, the cutter head and the weight arm together cooperating with means for crowding the cutter head against the seam of coal. In the aforesaid patent the cutter head and the weight arm are moved in a generally circular path, and are mounted upon a turntable having the means associated therewith for crowding the cutter head in a circular path against the seam of coal. The turntable for crowding the cutting head is arranged to cooperate with means for moving the coal fragmented from the seam off to one side of the machine as the cutting head makes its movement across the seam, a loading machine generally in the form of a shaker conveyor being disposed to one side of the room in which the miner is located to remove the material fragmented from the seam.

According to the present invention the coal is fragmented from the seam by a cutter head having a straight line motion, impulses being transmitted to the cutting head by a weight also having a straight line reciprocating motion, there being a linkage connecting the cutting head to the moving weight, so that the change in momentum of the weight is transmitted to the cutter head in the form of an impulse designed to create a condition of localized high stress in the seam adjacent the cutting head. The machine of this present invention is also characterized by a conveyor associated with the cutter head, the conveyor being adapted to receive the coal fragmented by the cutter head and to discharge same upon a main conveyor moving the fragmented coal substantially longitudinally of the machine. The main conveyor includes a discharge boom at the rear of the machine, the discharge boom being adapted to swing horizontally and vertically so that it may be disposed above a haulage vehicle such as a mine shuttle car, or above a moving belt conveyor.

The machine according to the present invention is preferably mounted upon crawler treads so that it may conveniently be spotted as desired in a room. The main frame supported upon the crawler treads also supports an auxiliary frame which is movable translatively with respect to the main frame, and so arranged that a crowding force may be applied from the main frame to the auxiliary frame and against the cutter head.

With the foregoing considerations in mind it is a principal object of this invention to afford a combined cutting and loading machine in which the cutting action is achieved by impulses directed against a translatively movable cutting head, and in which the coal fragmented by the machine is conveyed to the rear thereof for discharge onto any suitable haulage means.

Other objects and important features of the invention will be apparent from the study of the specification following taken with the drawings, which together show a preferred embodiment of the invention, and what is now considered to be the best mode of practicing the principles thereof. Other embodiments of the invention will be suggested to those having the benefits of the teachings herein, and it is therefore intended that the scope of the invention not be limited by the precise embodiment shown, the scope of the invention being intended to be defined only by the terms of the claims subjoined.

In the drawings:

Fig. 1 is a plan view of a mechanical miner having embodied therein the improvements according to the present invention;

Fig. 2 is an enlarged plan view of the cutting end thereof;

Fig. 3 is a phantom side elevation view of the cutter end thereof showing the positions taken by the cutter head in moving with respect to the face of a seam of coal;

Fig. 4 is a longitudinal cross sectional view taken along the line 4—4 of Fig. 2 looking in the direction of the arrows;

Fig. 5 is a transverse cross sectional view taken along the line 5—5 of Fig. 2 looking in the direction of the arrows;

Fig. 6 is an exploded partly schematic and perspective view of the cutter head and the impulse transmitting weight associated therewith, together with the drive mechanism for the cutter head and the impulse transmitting weight;

Fig. 6A is a section taken along the line 6A—6A of Fig. 5 looking in the direction of the arrows and showing details of a mechanism for absorbing shock from the impulse transmitting weight;

Fig. 7 is a perspective view of the impulse transmitting weight and the means for arresting the movement thereof when resistance is no longer afforded to the cutter head seen in Fig. 6;

Fig. 8 is a schematic view of the cutter head and the impulse transmitting weight associated therewith, the cutter head in this view being shown as starting to penetrate into a coal seam, and the crank for giving movement to the impulse creating weight being at the 0° position thereof;

Fig. 9 is a view similar to Fig. 8, but showing the driving crank at the 140° position thereof, and showing the crowding effect upon the cutter head, the cutter head in this view being still at the start of its penetrating movement into the coal seam;

Fig. 10 is a view similar to Fig. 9 but showing the cutter head as having penetrated a distance of approximately one-eighth inch into the coal seam, the driving crank having moved a total angle of approximately 180°, and showing the crowding effect upon the cutter head;

Fig. 11 shows the position of the cutter head in effecting approximately two inches penetration into the coal seam, the drive crank during such movement having moved through a total angular distance of 220°, and also showing the effect of the crowd upon the cutter head;

Fig. 12 is a view similar to Fig. 11, but showing the cutter head as having penetrated into the seam of coal approximately three inches, and showing the driving crank therefor having moved through a total angular distance of approximately 300°, and showing the effect of the crowd upon the cutter head;

Fig. 13 is a view similar to Fig. 12, but showing the cutting head stalled against the coal seam by the resistance thereof to the cutter head, the driving crank in such position having rotated through an angle of 360°, and now being at the 0° angular position, and showing the effect of the crowd upon the cutting head, the impulse transmitting weight now moving forward from the rest position, the velocity-time curve shown in this view illustrating the changing acceleration of the impulse transmitting weight;

Fig. 14 is a view similar to Fig. 13, the crank having rotated to an angle of 180°, and the impulse transmitting weight having reached the end of its forward travel to be reversed in its direction, and showing the crowding effect on the cutter head;

Fig. 15 shows the situation obtaining when the cutter head is no longer encountering resistance and the coal is being fragmented from the seam, the drive crank being in a position of rotation of approximately 140°, the crowd effect against the cutter head still obtaining, since the cutter head has not yet lunged forward by the lack of resistance against the cutting head;

Fig. 16 shows the lunging forward of the cutter head when resistance thereto is no longer afforded, both the cutter head and the impulse transmitting weight having lunged forward, and also showing the crank driving the impulse transmitting weight and the cutter head as having rotated to an angle of approximately 230°;

Fig. 17 shows the stopping of the impulse transmitting weight by the braking thereof, the drive crank meanwhile having rotated to an angle of 280°, the cutter head having moved with respect to the crowd by the lunging of the cutter head, and showing the velocity curve of the impulse transmitting weight;

Fig. 18 shows the relative positions of the cutter head and the impulse transmitting weight when the cutter head is not meeting with resistance afforded by the coal seam, the position of the drive crank being at the 0° position thereof; and Fig. 19 is a view similar to Fig. 18 but showing the drive crank at a position corresponding to 180° angular movement thereof.

*General description of machine*

Referring now particularly to Figs. 1 to 5 of the drawings, the improved mechanical miner according to the present invention is indicated generally by the reference numeral 25. It comprises a main frame 26 supported upon crawler treads 27 powered by a drive motor 28. The frame 26 affords a support for a cutter head 29 which is movable up and down in a vertical direction with respect to the working face of a seam of coal 31 or the like, the cutter head 29 being movable in such directions by means of cylinders 32 mounted on each side of the centerline of the frame 26 and pivoted at their forward ends 33 to a cutter head drive housing 34, the other end of the cylinder 32 being pivoted at 36 to a motor 40 which is movable both translatively and rotatively with respect to the main frame 26.

The housing 34 is thus adapted to rotate about an axis A—A upon actuation upon the cylinders 32, the axis A—A, see Fig. 5, being common to a driven shaft 37 contained within the housing 34, so that irrespective of the tilting movement of the cutting head 29 as seen in Fig. 3, power will be transmitted from a drive shaft 38 from the motor 40 having a miter gear 39 at the end thereof which meshes with a similar miter gear 41 mounted upon the shaft 37. As seen in Fig. 6, a shock absorbing coupling 30 is interposed on the shaft 38 between the motor and the miter gear 39. The drive shaft 38 is housed within a shaft housing 45 which forms a support for the cutter head drive housing 34, the details of which will be described as this specification proceeds.

It may be noted that the cutter head 29 is driven by mechanisms symmetrical to a center-line of the machine. Description of one of such symmetrical mechanisms is believed to suffice for the other.

Power is supplied to the cutter head 29 by means of the motors 40. The motors 40 are movable translatively together with the cylinders 32, the housing 34 and the cutting head 29 upon laterally spaced gib rails 43, and are crowded against the coal seam 31 by means of crowding cylinders 50, one end 44 of each being fixed to a turntable 51, a piston rod 46 of the cylinder 43 being connected at 47 to an arm 48 fixed to the shaft housing 45.

The turntable 51 turns on a pivot indicated generally by the reference numeral 52, and is pivoted about the axis 52 by means of a swinging cylinder 53 anchored at 54 to the main frame 26, the cylinder 53 including a piston rod 56 which is pivotally connected at 57 to the turntable 51.

It will be seen that the cutter head 29 is thus able to move in a vertical direction with respect to the face of the coal seam 31 by means of the raising and lowering cylinder 32 and to be able to move horizontally with respect thereto on the turntable 51 together with its drive motors 40 and drive shaft housings 45 by means of the swinging cylinder 53, at the same time being crowded against the seam 31 by means of the crowding cylinders 43.

The coal fragmented from the seam 31 by means of the cutter head 29 is conveyed away therefrom by means of a cutter head flight conveyor 58 which is movable with the cutter head 29, and adapted to discharge the material conveyed thereby onto a flight conveyor 59 movable longitudinally of the main frame 26 and centrally thereof.

The flight conveyor 59 includes an articulated section 61 so that the flights may be accommodated in the swinging movement of the turntable 51. A discharge boom referred to generally by the reference numeral 62 is adapted to swing about a pivot 63 by discharge boom swinging cylinders 64, and to be raised into proper position by lifting cylinders 66. The precise details of the construction of the flight conveyor 59 and the articulated section 61 thereof and the discharge boom 62 form no part of the present invention except as they may be claimed in combination with the mechanical miner according to the present invention. It will be understood that the flight conveyor 59 may be provided with any suitable slack take-up device (not shown) to compensate for the change of length of travel of the conveyor during articulation of the several sections thereof. However, they are described partly in detail at this point more easily to understand their cooperation with the cutter head flight conveyor 58 and the construction of the cutter head flight conveyor 58.

*Description of conveyors for cuttings removal*

The conveyors for removing material which has been cut by the cutting head 29 consist of the flight conveyor 59 and the cutter head flight conveyor 58. The flight conveyor 59 includes a trough section 71, see Figs. 2 and 4, having a bottom trough plate 72 and an upper trough plate 73. The bottom trough plate 72 provides a path for the return run 74 of the chain flight, and the upper trough plate 73 provides a path for the conveying run 75 of the flight conveyor. The trough section 71 is adapted to swing with the turntable 51 but not to move translatively with respect thereto. A trough section 76 consists of a bottom plate 77 and an upper trough plate 78 for the return and conveying runs respectively, the two being adapted to pivot with respect to a tubular support 79 extending between the motor housings 40 and mounted so as to furnish support for pivotal movement of the trough section 76. The trough section 76 is thus adapted to move up or down in a vertical direction in accordance with the movement of the actuating cylinders 32. The telescoping trough section 81 has an upper trough plate 82 resting upon the upper trough plate 78 of the vertically tilting trough section 76, and a lower trough plate 83 which underlies the lower trough plate 77 of the tilting trough section 76. The trough section 81 is thus adapted to telescope with respect to the tilting trough section 76 in accordance with the extension of the crowding cylinders 43. An idler shaft 84 at the forward end of the upper trough plate 82 and the lower trough plate 83 provides a point where the flight conveyor is reversed in direction, the lower trough plate 83 being curved around the shaft 84 to provide a guide for the chain flight conveyor.

Referring now also to Fig 5, the cutting head flight conveyor 58 includes a pair of laterally spaced frames 86, which are held in spaced relationship by an upper plate 87 supporting the upper run of a chain flight conveyor 89, the return run being supported on a plate 91 spacing the frame members 86. It should be noted that there are two cutter head flight conveyors 58 in side by side relationship, each being driven from the idler shaft 84. The chain flight conveyor 89 is trained around a sprocket 92 supported by the upper plate 87 and around a forward idler shaft 93 also supported by the upper plate 87. Each chain flight 89 is driven by a sprocket 94 which turns with the idler shaft 84, a separate drive chain 96 for the flight conveyors 58 being trained around the sprocket 94 and around spaced sprockets 95 and 97. The spaced sprockets 95 and 97 are adapted to engage the chain flights 89 and to move the upper run thereof in a direction to discharge the material being conveyed thereby onto the flight conveyor 59. It will be seen that the flight conveyor 58 will discharge its contents upon the flight conveyor 59 in all positions thereof and in all positions of the cutter head 29 and all positions thereof with respect to the turntable 51.

*Description of impulse transmitting mechanism for cutter head*

As has been previously explained, the cutter head drive housing 34 is adapted to turn on an axis A—A which is common to the axis of the driven shaft 37, the cutter head drive housing 34 being rotated about the axis A—A by the cylinders 32, the motor contained within the motor housing 40 and the drive shaft 38 therefrom being arranged to turn horizontally with the turntable 51, but not to move in a vertical plane. Referring again to Fig. 5, the drive shaft housing 45 for the drive shaft 38 is provided with a trunnion 101 which supports a bushing 102 and a bearing 103 fitted to the driven shaft 37. A bearing 104 supports the other end of the driven shaft 37 and is retained within a bearing flange 106 in a closure plate 107 for the cutter head drive housing 34. It will be seen that the trunnion 101 enables the housing 34 to be swiveled thereabout on the axis A—A which is common to the driven shaft 37.

The driven shaft 37 has fast thereon an eccentric standard tooth form pinion 108 which meshes with a variable speed gear 109 fast upon a crank shaft 110 supported at one end in a bearing 112 and at the other end in a bearing 113. A similar variable speed gear 111 is disposed alongside the gear 109 and meshes with an eccentric pinion 115, see Fig. 6. A shaft 120 extends transversely of the machine and has the eccentric pinion 115 fast thereon. The other end of the shaft 120 has also fast thereon a similar eccentric pinion 115 which serves to maintain a similar gear train in locked relationship with the gear train thus far described. The form of the variable speed gears 109 and 111 may be that as shown in Sloane Patent No. 2,585,971, issued February 19, 1952, for Gearing.

The crank shaft 110 has a crank arm 114 and a crank throw 116 supporting a connecting rod bearing 117, a connecting rod 118 connecting the crank throw 116 with a bell crank 119 at the lower end thereof as seen also in Fig. 6, there being a pin 121 passing through the connecting rod 118 and the bell crank 119 to afford a pivotal connection therebetween. The bell crank 119 has a pinned connection at 122 with a cutter head arm 123 which extends to the forward end of the miner. It will be appreciated that there are two such cutter head arms 123, one on each side of the cutter head conveyor 58. The cutter head 29 joins the two laterally spaced cutter head arms 123 and comprises an upper plate 124 and a lower plate 126, see Fig. 6, which form a means of support for a cutter bit 127 having a row of teeth 128 on the forward edge thereof.

The bell crank 119 also has a pinned connection 131 with a pair of arms 132 which extend in a direction toward the cutter head 29. The forward ends of the two arms 132 are joined by a pin 130 to a block 133 which is best seen with reference to Figs. 5 and 6A. The block 133 has a recess 134 which supports a rubber bumper pad 136, and a bumper 137 which nests within the recess 134 and bears against the rubber bumper pad 136. The bumper 137 is supported on a dowel pin 138 extending into a downward extending arm 139 of an inverted generally U-shaped member 141 having a similar downward extending arm 142 to retain the block 133 therebetween. A set screw 143 varies the amount of pressure placed against the rubber pad 136.

The block 133 and the member 141 afford a resilient connection between the arms 132 and a weight 144 having upper and lower grooves 145 to ride on gibs 146 and 147, which gibs are formed integrally and respectively with top wall 148 and a bottom wall 149 of the cutter head drive housing 34. The rubber pad 136 thus minimizes any shock against the arms 132 resulting from sudden changes in momentum of the weight 144.

The variable speed gear 111 and the crank 114 are arranged to transmit through the connecting rod 118 a desired motion to the bell crank 119, which when the cutter head 29 is in contact with the seam of coal 31 will in turn transmit a linear motion to the weight 144. The linear motion of the weight 144 is so chosen that upon a change in the momentum thereof an impulse will be transmitted by the bell crank 119 into the cutter head 29 to cause the coal to be fragmented from the seam 31. The precise details of the motion of the weight arm 144 to give the desired impulse against the cutter head 29 will be discussed in more detail as this specification proceeds.

Mechanism is provided to prevent the misalignment of the arms 123 supporting the cutter head 29 in the event that one end of the cutter bit 127 should no longer be encountering resistance. It may be noted, however, that the arms 123 are rigidly connected to the upper plate 124 and the lower plate 126 supporting the cutter bit 127 but that any torsional strains are avoided by mechanism which will now be described. As seen with particular reference to Figs. 5 and 6, the pin 122 is connected to a torsion arm 151 which in turn is splined at 152 to a torsion tube 153 extending laterally of the machine 25 and beneath the flight conveyor 59 and between the cutter head drive mechanism housings 34 on each side of the flight conveyor 59. The torsion tube 153 has a reduced portion 154 at each end thereof which is supported in a hollow boss 156 disposed in an inside wall 157 of the cutter head drive housing 34. It will be seen that the torsion arms 151 and the torsion tube 153 afford a connection between the drive mechanisms contained within the cutter feed drive mechanism housing 34, so that they are kept in step at all times.

Mechanism is provided so that the crowding action of the crowding cylinders 43 seen in Fig. 1 is maintained against the cutter head arm 123, and in such a fashion that while the crowding force is maintained thereagainst, the cutter head arm 123 may move with respect to such mechanism affecting crowding movement. To this end each cutter arm 123 is provided with a cam surface 158 substantially of an inverted V configuration which cooperates with a cam follower arm 159 having a cam roller 161 at the upper end thereof as seen more clearly in Fig. 6. The cam roller 161 rides on the V-cam 158, and the movement of the roller in a vertical direction as would be occasioned by the movement of the cutter arm 123 either in a forward direction or in a rearward direction as seen in Fig. 6 is opposed by a piston rod 162 connected to a piston, not shown, slidable in a cylinder 163, resting upon a bottom closure plate 164 of the cutter feed drive housing 34, as seen more clearly in Fig. 5. Vertical stability is given to the piston rod 162 and the cam follower 159 by bracing arms 166 which flank the arm 123. The bracing arms 166 are pivotally connected to a pin 167 holding the cam roller 161 to the cam follower 159 and are pivotally connected to the other end thereof to a fixed abutment 168 extending upward from the bottom closure plate 164 of the housing 34.

The cutter arm 123 is prevented from moving in a vertical direction as might be occasioned by the crowding action of the crowding cylinders 43 in attempting to cause the V-cam 158 to rise with respect to the cam roller 161. In order to prevent such movement, the top wall 148 of the drive housing 34 has depending therefrom mounting brackets 170 which support a roller 175 riding on the top surface of the cutter head arm 123.

The reciprocating weight 144 has been described as imparting an impulse upon changes in momentum thereof into its associated cutter head arm 123. Under certain conditions when resistance is no longer being afforded the cutter head 29, the inertia of the moving weight 144 will cause it to lunge in a direction toward the cutter head 29. In order to prevent such lunging movement of the weight 144, it is restrained partly in its movement until it once more resumes a motion which is consistent with or is a function of its mass as compared with the mass of the cutter head 29 and its cutter head arm 123. As seen in Fig. 7, the rear end of the weight 144 is provided with a lug 171 which engages a stop arm 172 pivotally connected to rock arms 173 pivotally anchored to a fixed abutment 174 extending upward from the bottom wall 149 of the housing 34. The stop arm 172 is pin connected at 176 to a combined brake applying and return arm 177. Spaced abutments 179 provide a point of pivotal connection 178 with the brake applying and return arm 177.

The pin 176 provides a support for a plurality of spaced brake shoes 181, each brake shoe 181 being spaced from its adjacent one by blocks 182 of friction material which are anchored at any convenient place within the housing 34, see also Fig. 5.

The amount of pressure between the brake shoes 181 and the blocks of friction material 182 is adjusted by a brake adjusting arm 183 which is pivoted at 184 substantially centrally thereof to a pressure plate 186 which bears against the outermost brake shoe 181. One end of the adjusting arm 183 bears against a spring 187 adjusted in its load by a set screw 188 threaded into the side of the housing 34 as seen more clearly in Fig. 5. The pressure between the brake shoe 181 and the blocks of friction material 182 is also adjusted by a set screw 189 threaded into the side wall of the housing 34 and bearing against the other end of the arm 183.

It will be seen that when the weight 144 lunges in a forward direction, that is to say, in a direction toward the working face of the seam 31, the lug 171 will engage the arm 172 which in turn will rock the brake applying arm 177 causing a braking action between the brake shoes 181 and the blocks of friction material 182, thereby arresting the lunging movement of the weight 144.

The brake applying and return arm 177 also has connected thereto a piston rod 191, having a piston, not shown, at the end thereof slidable in a return cylinder 192. The rocking of the brake applying and return arm 177 caused by the lunging movement by the weight 144 causes the piston rod 191 to extend from the cylinder 192. The piston rod end of the cylinder 192 is connected to a supply of air at superatmospheric pressure, which is designed to return the piston rod 191 and to rock the arm 177 in an opposite direction after the conclusion of the braking operation just described. As seen in Fig. 7, the piston rod end of the cylinder 192 has connected thereto a supply line 190 having a check valve 190a connected therein. The check valve 190a operates to restrain the movement of the piston within the cylinder 192, but will open to a supply of air for moving the piston rod 191. The force against the piston within the cylinder 192 is sufficient to overcome the friction between the brake shoes 181 and the friction material 182 so that the arm 177 may be rocked slowly in such opposite direction and at the same time cause the stop arm 172 to engage the lug 171 to return the weight 144 to a position where it will resume its normal reciprocating movement caused by the operation of the bell crank 119, the connecting rod 118 and the crank 114.

Operation

In the operation of the miner according to the present invention it is advanced against a seam of coal as seen in Fig. 1. Preferably, the cutter head 29 together with its conveyor 58 and its housing 34 is rotated about the trunnion 101, seen in Fig. 5, so that the cutter head 29 bears against the seam 31 near the top thereof. The impulse transmitting mechanism located within the housing 34 is driven from the motor 40 which turns with the turntable 51, in a horizontal direction, and as has been explained, the power therefrom is transmitted to the driven shaft 37 by means of the miter gears 39 and 41, the axis upon which the housing 34 turns being common to the axis of the driven shaft 37.

The crowding effect of the crowd cylinders 43 is of the order of 8,000 pounds, but when reciprocating movement is given to the weight 144 there will be at times an instantaneous impulse transmitted into the cutter head 29 of the order of 25,000 pounds.

The first action of the cutter head 29 when in position near the top of the seam 31 is to make a small kerf substantially of triangular cross section, the roof marking a side of such triangular shaped kerf. The cutter head is then lowered to cut a more or less trapezoidal shaped kerf, one side of the trapezoid being marked by the roof, successive trapezoidal shaped kerfs being cut, until a bench is created along the top of the seam. The bench extends inward from the face of the seam a distance equal to the depth of shearing or slicing action of the cutter head, as seen in Fig. 1. After the bench is thus formed by the cutting near the top of the seam of the kerfs described above, the cutter head 29 slices off layers of coal from near the top of the bench, the cutter head being lowered to successive positions from top to bottom of the seam 31, as seen in Fig. 3.

Prior to the contact by the cutter head 29 with the seam 31 the cutter head 29 will have a reciprocating action with a longer stroke as compared to the stroke of the weight 144, the difference in such strokes being in accordance with ratio of the mass of the weight 144 to the mass of the cutter head 29 together with the cutter arm 123. When the cutter head 29 comes into contact with the coal seam its stroke decreases but the stroke of the weight 144 increases until the resistance of the coal becomes equal to the low accelerating force of the weight 144. As long as the resistance of the coal exceeds the force of the low accelerating rate the cutter head 29 will continue to contact the coal seam 31. In fragmenting coal against any higher resistance, the advance of the cutter head 29 will be intermittent while the feed by the crowding motors 43 will be reasonably constant. The bell crank 119 affording the connection between the weight 144 and the cutter arm 123 enables intermittent advancing of the cutter head while the crowd may be maintained uniformly through the housing 34 and against the cam follower 159 and the cam roller 161 which coacts with the V-cam surface 158.

At the beginning of a cutting cycle the weight 144 is accelerated toward the cutter head 29 but the reacting force from this acceleration is opposed by the crowding force from the crowding cylinders 43. As long as the crowding force is greater than the reacting force induced by the weight 144 in its low acceleration rate toward the cutter head 29, the cutting head 29 will be held in contact with the coal with a force which is equal to the difference between the crowding force and the reacting force. Near the end of the forward stroke of the weight 144 its motion is changed to one of rapid deceleration and the force of the rapid deceleration plus the crowding force is then applied to the cutter head. This force is maintained during the rapid backward acceleration thereof, and during the period such force is maintained the cutter head 29 will advance into the coal with increasing velocity. When the velocity of the cutter head exceeds that caused by the crowding effect, the V-cam 158 will enable the cutter head to advance with respect to any advance which would be normally achieved by the crowding effect alone.

At the point where rapid backward acceleration of the weight 144 ceases with respect to the cutter head 29, the cutter head may be moving forward with considerable velocity. The weight 144 has a definite relative motion with respect to the cutter head 29 which would enable the weight to be moving backward relative to the cutter head, but since the cutter head may have a forward absolute velocity which may be higher than the maximum velocity of the weight 144 relative to the cutter head the absolute motion of the weight 144 may be still in a forward direction. At the point where the relative motion of the weight 144 to the cutter head 29 changes to one of slow reverse deceleration the forces are in a direction to retard the weight 144, but the absolute forward momentum of the weight 144 and the cutter head 29 will cause the cutter head to continue to advance with a decreasing velocity until its motion ceases, where it remains in contact with the face of the seam until the high forces are applied during the next cycle of the weight 144 and the cutter head 29.

The highest force that can be asserted by the cutter head 29 is when the cutter head is stalled against material which it cannot penetrate. Obviously, if the resistance of the material is less than the stalling force against the cutter head 29, the coal will be fragmented from the seam and the cutter head 29 will be accelerated in a forward direction, the high forces of deceleration and backward acceleration of the weight 144 being reduced.

The V-cam 158 also provides a means for correcting the tendency of the cutter head 29 to accelerate when resistance is no longer afforded by the coal seam. The cutter head without the V-cam surface, will normally lunge forward but the resistance to movement of the piston rod 162 of the cylinder 163 prevents such lunging movement, any lunging movement permitted causing the roller 161 to ride on one of the V-cam surfaces.

The coaction of the crowd, the reciprocating weight and the cutter head which has just been described in a general fashion can also be understood with reference to Figs. 8 to 19 of the drawings which describe particular phases of the operation of said elements. Thus Fig. 8 corresponds to the position when the cutter head 29 is first contacting the seam and the crank 114 is at the 0° position thereof. The crowding effect at the cam roller 161 has not yet been evident against the V-cam 158, nor has the weight 144 yet had movement relative to the cutter arm 123. The point $x$ on the velocity-time curve shown in Fig. 8 represents the velocity of a centroid on the bell crank 119 which would give equal velocity to the weight 144 and the cutter arm 123 with due regard for the differences in their mass.

Fig. 9 shows a relative position of the weight 144 and the arm 123, the crank 114 having rotated through an angle of 140°. It will be seen that the crowding effect caused by the crowd cylinders 43 has caused the roller 161 to ride up on the forward surface of the V-cam 158. At this point the weight 144 is commencing to decelerate rapidly in a forward direction, but the force of such deceleration transmitted through the bell crank 119 is additive to the crowding force of the cylinders 43 which, as has been stated, is of the order of 8000 pounds. Point $x$ on the velocity-time curve in Fig. 9 represents the point of change from slow acceleration of the weight 144 to rapid deceleration thereof.

Fig. 10 represents the situation obtaining at 180° displacement of the crank 114, the cutter head 29 having penetrated the seam 31 a distance of one-eighth inch. Point $x$ on the velocity-time curve of this figure represents the velocity of the centroid of the bell crank 119, which velocity is giving an impulse to the cutter head 29. It should be noted also that the crowd effect of the cylinders 43 is still manifested on the V-cam 158 so as to be additive to the impulse effect.

Fig. 11 shows a penetration of two inches at 220° displacement of the crank 114, the point $x$ representing the velocity of the centroid of bell crank 119, the impulse from the changing momentum of the weight 144 having been largely transmitted into the seam 31. The crowd effect at this point is still present but the cutter head 29 has advanced with respect to the crowd, velocity having been given thereto by the impulse transmitted from the weight 144 through bell crank 119.

Fig. 12 represents the condition obtaining at 300° displacement of the crank 114. The cutter head 29 has penetrated three inches into the seam 31, and has advanced with respect to the crowd as shown by the position of the roller on the V-cam 158. The shaded portion of the velocity-time curve represents the coal cutting portion of the stroke which has taken place between the 140° and 300° positions of the crank 114, the cutting impulse having been transmitted from the reciprocating weight 144.

The phenomena taking place as has been described with reference to Figs. 8 to 12 is with the assumption that the cutter head 29 is penetrating the seam 31. However, as the cutter head 29 advances into the seam, it is met with increasing resistance until it is stalled against the seam. At this time there is no motion of the cutter head 29, and both the absolute and relative motions of the reciprocating weight 144 are the same. The weight 144, by its reciprocating motion, is thus able to transmit repeated impulses into the cutter head 29 together with an added effect caused by the crowding cylinders, until the repeated forces fragment the coal from the seam.

Fig. 13 shows the crank 114 at the 0° position thereof, the cutter head 29 being stalled against the seam 31, and the weight 144 reciprocating with respect thereto. In this figure the crowd effect of 8,000 pounds is manifest against the V-cam, overcoming the reacting forces from slow acceleration of the reciprocating weight 144, which reacting forces are subtracted from the crowding force leaving the difference as a force applied by the cutter head against the seam 31. Point $x$ on the velocity-time curve is the speed of the centroid of the bell crank 119, which at this instant is zero.

Fig. 14 shows the crank 114 at the 180° position thereof, with the cutter head 29 stalled and the weight reciprocating with respect thereto. The crowd effect is still being manifested and the point $x$ on the velocity-time curve shows that the centroid of bell crank 119 has finished its period of fast deceleration.

Fig. 15 shows the situation obtaining after repeated cycles of operation, breakthrough in the seam 31 taking place after 140° of angular travel of the crank 114. The crowd effect is still present, and the breakthrough may take place after the instant of change from slow acceleration to rapid deceleration of the centroid.

Fig. 16 shows the breakthrough being continued, the crank having traveled to the 230° position. The crowd effect has largely disappeared since the cutter head 29 and the weight 144 have lunged forward. Point $x$ on the velocity-time curve is the velocity of the centroid at the instant when breakthrough starts (140° position of the crank 114) while point $x'$ on the velocity-time curve represents the lunging of the centroid of bell crank 119 caused by the lunging of both the weight 144 and the cutter head 29, both the weight and the cutter head being slowed down in their movement by the V-cam surface, and the brake shown in Fig. 7 also commencing to operate to halt the lunging movement of the weight 144.

Fig. 17 represents the completion of lunging movement of the cutter head 29 and the weight 144 after the breakthrough. In this view both cutter head 29 and weight 144 have advanced with respect to the crowd. Point x on the velocity-time curve shows the completion of the braking of the weight 144 by the mechanism shown in Fig. 7, its velocity being substantially halted.

Figs. 18 and 19 show the velocity-time curve of the weight 144 when the cutter head is no longer in contact with the seam 31, as for example, when the breakthrough of Figs. 15 to 17 is completed. The cutter head 29 is now reciprocating at rather a large amplitude as compared to that of the weight 144 since its mass is greatly less. It will be seen that the cutter head also moves to and fro with respect to the crowd. The curves shown represent the motion of the centroid of bell crank 119 due to the action of the forces against the V-cam.

Such a situation will obtain until the cutter head is once more moved into engagement with the seam 31 when the operations, as shown in Figs. 8 to 17, will once more obtain.

It may be noted that the breakthrough will occur at points other than those shown on the velocity-time curve of the several figures, but the points selected for description illustrate generally the phenomena taking place.

As the cutter head 29 fragments coal from the seam its flight conveyor 58 will receive the coal so fragmented and discharge same upon the flight conveyor 59. The conveyor 58 of the cutter head will convey the coal away from the seam 31 for all positions of the cutter head shown in Fig. 3.

The mechanical miner according to the present invention presents many advantages, one of the most important being that relatively large lumps of coal are fragmented from the seam by its use. Since the coal is not subjected to a tearing action by cutter bits, such as are used in conventional continuous miners, the presence of dust at the working is minimized to a great extent.

While the invention has been described in terms of a preferred embodiment, the scope of the invention is intended to be limited only by the terms of the claims here appended.

I claim:

1. In a mechanical miner, a frame having mine floor engaging means for moving said miner along a mine floor, a turntable mounted for rotative movement with respect to said frame, a second frame including a cutter head mounted thereon and adapted to be moved into contact with a seam of frangible material, means for moving said cutter head in a vertical direction with respect to said seam and said second frame, an endless conveyor supported by said cutter and adapted to convey material which has been fragmented by said cutter head, an endless conveyor supported on said main frame adapted to receive the discharge from said first named conveyor, means for providing an impulse by said cutter head to create a condition of localized high stress in said seam adjacent said cutter head and to fragment material from said seam comprising a weight adapted to reciprocate with respect to said cutter head, power means for imparting reciprocatory movement to said weight including a variable speed gear, a crank driven at the speed of said variable speed gear, a lever including means for connecting said lever to said crank, means affording a connection between said reciprocating weight and said lever, means affording a connection between said cutter head and said lever, said crank and said lever providing for acceleration of said weight during the major portion of its travel and for providing rapid deceleration of said weight during the remaining portion of its travel in a direction towards said cutter head, means providing crowding of said cutter head against said seam of frangible material, means for arresting said weight in its travel in a direction towards said cutter head when said cutter head is no longer encountering resistance from said seam, and means for returning said weight to a position for resumption of its regular reciprocating movement after having been arrested in its movement by said arresting means.

2. In a mechanical miner, a frame having mine floor engaging means for moving said miner along a mine floor, a turntable mounted for rotative movement with respect to said frame, a second frame including a cutter head mounted thereon and adapted to be moved along a straight line into contact with a seam of frangible material, means for moving said cutter head in a vertical direction with respect to said seam and said second frame, an endless conveyor supported by said cutter head and adapted to convey material which has been fragmented by said cutter head, an endless conveyor supported on said main frame adapted to receive the discharge from the first named conveyor, a weight adapted to reciprocate in a straight line with respect to said cutter head, power means for imparting reciprocating movement to said weight, and a linkage connecting said weight and said cutter head for transmitting an impulse into said cutter head from said weight in response to changes in momentum of the latter, hydraulic means providing crowding of said cutter head against said seam of frangible material, friction means for arresting said weight in its travel toward said seam when said cutter head is no longer encountering resistance from said seam, and elastic fluid pressure means for returning said weight to a position for resumption of its regular reciprocating movement after having been arrested by said arresting means.

3. In a mechanical miner, a frame having mine floor engaging means for moving said miner along a mine floor, a turntable mounted for rotative movement with respect to said frame, a second frame including a cutter head mounted thereon and adapted to be moved along a straight line into contact with a seam of frangible material, means for moving said cutter head in a vertical direction with respect to said seam and said second frame, an endless conveyor supported by said cutter head and adapted to convey material which has been fragmented by said cutter head, an endless conveyor supported on said main frame adapted to receive the discharge from the first named conveyor, a weight adapted to reciprocate in a straight line with respect to said cutter head, power means for imparting reciprocating movement to said weight, and a linkage connecting said weight and said cutter head for transmitting an impulse into said cutter head from said weight in response to changes in momentum of the latter, means providing crowding of said cutter head against said seam of frangible material, means for arresting said weight in its travel in a direction towards said cutter head when said cutter head is no longer encountering resistance from said seam, and means for returning said weight to a position for resumption of its regular reciprocating movement after having been arrested in its movement by said arresting means.

4. In a mechanical miner, a cutter head adapted to be moved in a straight line into contact with a seam of frangible material, a weight adapted to reciprocate in a straight line with respect to said cutter head, power means for imparting reciprocatory movement to said weight comprising a variable speed gear, a crank driven at the speed of said variable speed gear, a lever including means for connecting said lever to said crank, means affording a connection between said reciprocating weight and said lever, means affording a connection between said cutter head and said lever, said crank and said lever providing for acceleration of said weight during the major portion of its travel when said weight is moving in a direction towards said cutter head and for providing rapid deceleration of the said weight during the remaining portion of its travel in a direction towards said cutter head, said crank and said lever forming a means for transferring the change in momentum of said weight in the form of an impulse against said cutter head, hydraulic means for crowding said cutter head against said seam of frangible material, friction means for arresting said weight in its travel toward said seam when said cutter head is no longer encountering resistance from said seam, and elastic fluid pressure means for returning said weight to a position for resumption of its regular reciprocating movement after having been arrested in its movement by said arresting means.

5. In a mechanical miner, a cutter head adapted to be moved in a straight line into contact with a seam of frangible material, a weight adapted to reciprocate in a straight line with respect to said cutter head, power means for imparting reciprocatory movement to said weight comprising a variable speed gear, a crank driven at the speed of said variable speed gear, a lever including means for connecting said lever to said crank, means affording a connection between said reciprocating weight and said lever, means affording a connection between said cutter head and said lever, said crank and said lever providing for acceleration of said weight during the major portion of its travel when said weight is moving in a direction towards said cutter head and for providing rapid deceleration of the said weight during the remaining portion of its travel in a direction towards said cutter head, said crank and said lever forming a means for transferring the change in momentum of said weight in the form of an impulse against said cutter head, means for crowding said cutter head against said seam of frangible material, means for arresting said weight in its travel in a direction towards said cutter head when said cutter head is no longer encountering resistance from said seam, and means for returning said weight to a position for resumption of its regular reciprocating movement after having been arrested in its movement by said arresting means.

6. In a mechanical miner, a cutter head adapted to be moved in a straight line into contact with a seam of frangible material, a weight adapted to reciprocate in a straight line with respect to said cutter head, power means for imparting reciprocatory movement to said weight comprising a variable speed gear, a crank driven at the speed of said variable speed gear, a lever including means for connecting said lever to said crank, means affording a connection between said reciprocating weight and said lever, means affording a connection between said cutter head and said lever, said crank and said lever providing for acceleration of said weight during the major portion of its travel when said weight is moving in a direction towards said cutter head and for providing rapid deceleration of the said weight during the remaining portion of its travel in a direction towards said cutter head, said crank and said lever forming a means for transferring the change in momentum of said weight in the form of an impulse against said cutter head, means for arresting said weight in its travel in a direction towards said cutter head when said cutter head is no longer encountering resistance from said seam, and means for returning said weight to a position for resumption of its regular reciprocating movement after having been arrested in its movement by said arresting means.

7. In a mechanical miner, a cutter head adapted to be moved in a straight line into contact with a seam of frangible material, a weight adapted to reciprocate in a straight line with respect to said cutter head, power means for imparting reciprocatory movement to said weight comprising a varying speed gear, a crank driven at the speed of said variable speed gear, a lever including means for connecting said lever to said crank, means affording a connection between said reciprocating weight and said lever, means affording a connection between said cutter head and said lever, said crank and said lever providing for acceleration and deceleration of said weight so as to produce a high force against said cutter head when the weight is decelerating at a high rate in its movement towards said cutter head, and so as to produce a low force against said cutter head when the weight is accelerating at a low rate in a direction towards said cutter head, said crank and said lever forming a means for transferring the change in momentum of said weight in the form of an impulse against said cutter head, means for arresting said weight in its travel in a direction towards said cutter head when said cutter head is no longer encountering resistance from said seam, and means for returning said weight to a position for resumption of its regular reciprocating movement after having been arrested in its movement by said arresting means.

8. In a mechanical miner, a cutter head adapted to be moved in a straight line into contact with a seam of frangible material, a weight adapted to reciprocate in a straight line with respect to said cutter head, power means for imparting reciprocatory movement to said weight comprising a varying speed gear, a crank driven at the speed of said variable speed gear, a lever including means for connecting said lever to said crank, means affording a connection between said reciprocating weight and said lever, means affording a connection between said cutter head and said lever, said crank and said lever providing for acceleration and deceleration of said weight so as to produce a high force against said cutter head when the weight is decelerating at a high rate in its movement towards said cutter head and so as to produce a low force against said cutter head when the weight is accelerating at a low rate in a direction towards said cutter head, said crank and said lever forming a means for transferring the change in momentum of said weight in the form of an impulse against said cutter head, means for crowding said cutter head against said seam of frangible material, means for arresting said weight in its travel in a direction towards said cutter head when said cutter head is no longer encountering resistance from said seam, and means for returning said weight to a position for resumption of its regular reciprocating movement after having been arrested in its movement by said arresting means.

References Cited in the file of this patent

UNITED STATES PATENTS

| | | |
|---|---|---|
| 1,508,634 | Wilson | Sept. 16, 1924 |
| 2,308,517 | Konnerth | Jan. 19, 1943 |
| 2,329,875 | Cartlidge | Sept. 21, 1943 |
| 2,565,528 | Sloane | Aug. 28, 1951 |